(12) United States Patent
Kaneko et al.

(10) Patent No.: US 10,023,108 B2
(45) Date of Patent: Jul. 17, 2018

(54) VEHICLE LAMP WITH LIGHT MODULE FIXING PORTION

(71) Applicant: Toshiba Lighting & Technology Corporation, Yokosuka-shi, Kanagawa-ken (JP)

(72) Inventors: Takashi Kaneko, Yokosuka (JP); Kiyokazu Hino, Yokosuka (JP); Masayuki Ishiyama, Yokosuka (JP); Hiromitsu Shiraishi, Yokosuka (JP); Daisuke Kosugi, Yokosuka (JP); Toshihiro Hatanaka, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 255 days.

(21) Appl. No.: 14/886,895

(22) Filed: Oct. 19, 2015

(65) Prior Publication Data

US 2016/0185281 A1 Jun. 30, 2016

(30) Foreign Application Priority Data

Dec. 26, 2014 (JP) ................................. 2014-266181

(51) Int. Cl.
*F21V 17/10* (2006.01)
*B60Q 1/26* (2006.01)
(Continued)

(52) U.S. Cl.
CPC .............. *B60Q 1/2696* (2013.01); *B60Q 1/44* (2013.01); *F21S 41/143* (2018.01); *F21S 41/19* (2018.01);
(Continued)

(58) Field of Classification Search
CPC .......... F21V 17/10; F21V 17/12; F21V 17/14; F21V 17/18; F21V 17/20; F21V 17/104;
(Continued)

(56) References Cited

U.S. PATENT DOCUMENTS 4,500,946 A * 2/1985 Mikola ................ F21S 48/1122
362/267
4,754,382 A * 6/1988 Furlan ..................... F21S 48/10
362/304
(Continued)

FOREIGN PATENT DOCUMENTS

DE 10022494 A1 12/2000
DE 112011102839 T5 7/2013
(Continued)

OTHER PUBLICATIONS

May 31, 2016—(EP) Extended Search Report—App 15190081.8.
Mar. 6, 2017—(JP) Notification of Reasons for Refusal—App 2014-266181, Eng Tran.

*Primary Examiner* — Ismael Negron
(74) *Attorney, Agent, or Firm* — Banner & Witcoff, Ltd.

(57) ABSTRACT

A vehicle lamp includes a housing where a lighting device is disposed, and a fixing unit pressing the lighting device against the housing. The lighting device has a flange, a storage portion protruding from one surface of the flange, and a light-emitting module received in the storage portion opposite to the flange. The storage portion is received in a hole of the housing such that the fixing unit presses the flange against the housing in a peripheral edge of the hole.

19 Claims, 6 Drawing Sheets

(51) Int. Cl.
*B60Q 1/44* (2006.01)
*F21V 17/04* (2006.01)
*F21V 17/12* (2006.01)
*F21S 41/19* (2018.01)
*F21S 41/143* (2018.01)
*F21S 43/19* (2018.01)
*F21S 43/14* (2018.01)
*F21S 45/48* (2018.01)
*F21S 45/10* (2018.01)
*F21S 45/47* (2018.01)

(52) U.S. Cl.
CPC .......... *F21S 41/192* (2018.01); *F21S 41/194* (2018.01); *F21S 43/14* (2018.01); *F21S 43/19* (2018.01); *F21S 43/195* (2018.01); *F21S 45/48* (2018.01); *F21V 17/04* (2013.01); *F21V 17/12* (2013.01); *F21S 45/10* (2018.01); *F21S 45/47* (2018.01)

(58) Field of Classification Search
CPC ............... F21V 19/0055; F21S 48/1104; F21S 48/1109; F21S 48/1113
See application file for complete search history.

(56) References Cited

U.S. PATENT DOCUMENTS

| | | | | |
|---|---|---|---|---|
| 4,760,506 A | * | 7/1988 | Mochizuki | F21S 48/1113 362/267 |
| 4,991,067 A | * | 2/1991 | Nagengast | F21S 48/1113 362/519 |
| 5,186,535 A | * | 2/1993 | Yokoyama | F21S 48/1118 362/396 |
| 5,562,339 A | * | 10/1996 | Tanaka | B60Q 1/007 362/265 |
| 5,795,056 A | * | 8/1998 | Seiger | B60Q 1/007 362/263 |
| 6,176,604 B1 | * | 1/2001 | Dubrovin | F21S 48/1109 362/265 |
| 6,361,197 B1 | | 3/2002 | Katsumata et al. | |
| 6,382,823 B1 | * | 5/2002 | Kibayashi | B60Q 1/0094 315/82 |
| 6,866,409 B2 | * | 3/2005 | Fields | F21S 48/1122 362/429 |
| 7,726,980 B1 | | 6/2010 | Wang | |
| 8,414,163 B2 | * | 4/2013 | Hashimoto | F21V 3/00 362/368 |
| 8,678,632 B2 | | 3/2014 | Gallai et al. | |
| 2011/0063842 A1 | | 3/2011 | Takei et al. | |
| 2012/0049733 A1 | | 3/2012 | Gallai et al. | |

FOREIGN PATENT DOCUMENTS

| | | |
|---|---|---|
| EP | 1 298 383 A2 | 4/2003 |
| JP | H07-041806 U | 7/1995 |
| JP | 2004059981 A | 2/2004 |
| JP | 2008-276958 A | 11/2008 |
| JP | 2011-082141 A | 4/2011 |
| JP | 2013-536560 A | 9/2013 |
| JP | 2014-059981 A | 4/2014 |

* cited by examiner

VEHICLE LAMP WITH LIGHT MODULE FIXING PORTION

CROSS-REFERENCE TO RELATED APPLICATIONS

This application is based upon and claims the benefit of priority from Japanese Patent Application No. 2014-266181, filed on Dec. 26, 2014; the entire contents of which are incorporated herein by reference.

FIELD

Embodiments described herein relate generally to a vehicle lamp.

BACKGROUND

A vehicle lamp is provided with a lighting device where a light-emitting diode (LED) is disposed.

A projecting portion (also referred to as a bayonet or the like) that is used when the lighting device is mounted on a housing of the lamp is disposed in a main body portion of the lighting device.

A mounting member that holds the projecting portion of the lighting device is disposed in the housing of the lamp.

When the lighting device is mounted on the housing, the side of the lighting device where the projecting portion is disposed is inserted into the housing and the lighting device is allowed to rotate. Then, the lighting device is held in the housing of the lamp by the projecting portion and the mounting member.

This mounting method is called twist lock.

With this mounting method, the mounting and removal of the lighting device can be facilitated.

The vehicle lamp is subjected to vibration caused by traveling or is used in an environment of significant temperature change (−40° C. to 85° C.). In other words, the vehicle lamp is used in an environment in which a fastening part is likely to loosen.

Accordingly, the development of a vehicle lamp that can facilitate the mounting and removal of a lighting device during maintenance or the like and prevents detachment of the lighting device during the use of the vehicle lamp has been desired.

DETAILED DESCRIPTION

Figure 1A:
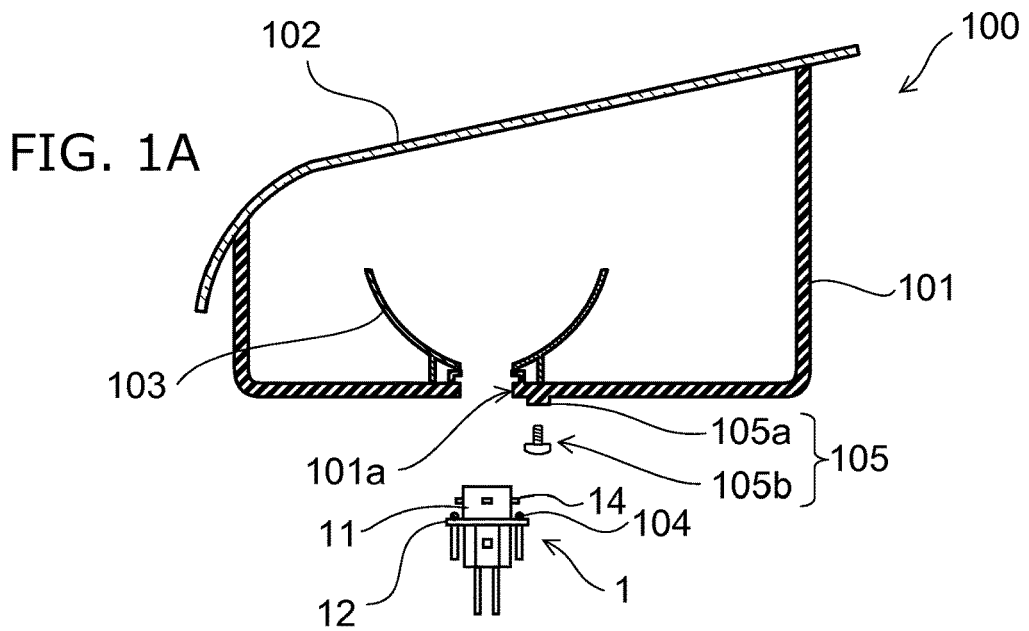
FIG. 1A is a schematic exploded view of a lamp 100.

The invention according to embodiments is a vehicle lamp that is provided with a lighting device; a housing where the lighting device is disposed; and a fixing unit which presses the lighting device against the housing. The lighting device has a flange portion; a storage portion that protrudes from one surface of the flange portion; and a light-emitting module that is disposed in the end portion of the storage portion on the side opposite to the flange portion side and has a light-emitting element. The housing has a hole where the storage portion is disposed. The fixing unit presses the flange portion against the housing in the vicinity of a peripheral edge of the hole where the storage portion is disposed.

With this vehicle lamp, the mounting and removal of the lighting device can be facilitated during, for example, maintenance. In addition, the lighting device is less likely to be detached during the use of the vehicle lamp.

The fixing unit can be provided with a seat portion that is disposed on the housing to be positioned in the vicinity of a peripheral edge of the flange portion outside the housing; and a fastening member that is provided with a head portion which is in contact with the flange portion and a male screw portion which is connected to the head portion and has a male screw corresponding to a female screw disposed in at least any one of the housing and the seat portion.

In this manner, breaking, splintering, cracking, or the like is less likely to occur in the flange portion.

The fixing unit can also be provided with a plate-shaped member that is disposed between the head portion and the flange portion.

In this manner, breaking, splintering, cracking, or the like is even less likely to occur in the flange portion.

The fixing unit can also be provided with a pressing member that has elasticity and is disposed in the housing so that one end portion side is in contact with the flange portion and the other end portion side is positioned in the vicinity of the peripheral edge of the flange portion.

In this manner, breaking, splintering, cracking, or the like is less likely to occur in the flange portion.

The fixing unit can be provided with a fastening member that is provided with a head portion which is in contact with the flange portion; and a male screw portion which has one end portion side connected to the head portion and the other end portion side disposed in a female screw disposed in the housing via a hole disposed in the flange portion.

In this manner, a simplified and cost-reduced configuration can be achieved.

The flange portion can contain a high thermal conductivity resin.

The high thermal conductivity resin is brittle, and thus is likely to cause breaking, splintering, cracking, or the like. With the vehicle lamp described above, however, breaking, splintering, cracking, or the like is less likely to occur.

Accordingly, a reduction in weight can be achieved by the use of the high thermal conductivity resin.

Hereinafter, embodiments will be described with reference to accompanying drawings. In the drawings, like reference numerals will be used to refer to like elements and detailed description thereof will be appropriately omitted.

Examples of a vehicle lamp (hereinafter, simply referred to as a lamp) can include a front combination light, a rear combination light (such as a stop lamp, a tail lamp, a turn signal, and a fog lamp), a passenger compartment light, and a trunk light disposed for a car.

A case where the lamp is a single lamp-type stop lamp will be described as an example below. However, the lamp is not limited to the single lamp-type stop lamp. The lamp may be a lamp disposed for a car, a railway vehicle, or the like.

Figure 1B:
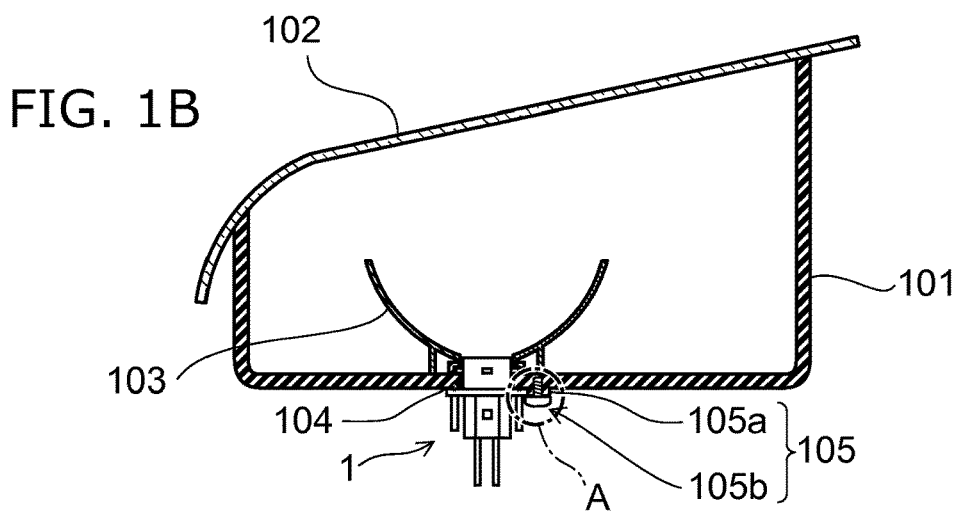
FIG. 1B is a schematic sectional view of the lamp 100.
Figure 1C:
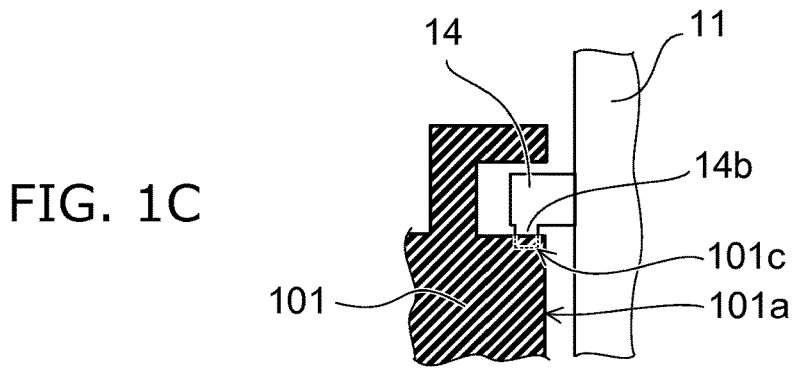
FIG. 1C is a schematic enlarged view illustrating an example of a relationship between a projecting portion 14 and a fitted portion 101c.

FIGS. 1A, 1B, and 1C are each a schematic sectional view illustrating an example of a lamp 100 according to this embodiment.

FIG. 1A is a schematic exploded view of the lamp 100.
FIG. 1B is a schematic sectional view of the lamp 100.
FIG. 1C is a schematic enlarged view illustrating an example of a relationship between a projecting portion 14 and a fitted portion 101c.

As illustrated in FIGS. 1A and 1B, a lighting device 1, a housing 101, a cover 102, a reflection unit 103, a seal member 104, and fixing units 105 to 107 are disposed in the lamp 100.

The housing 101 has the shape of a box with one open end portion side. The housing 101 can be formed of, for example, a non-light-transmitting resin.

A mounting hole 101a is disposed in a bottom surface of the housing 101. A storage portion 11 of the lighting device 1 is inserted into the mounting hole 101a.

A concave portion (not illustrated) is disposed at a peripheral edge of the mounting hole 101a. The projecting portion 14 is inserted into the concave portion. As illustrated in FIG. 1C, a plurality of the concave fitted portions 101c (corresponding to an example of a first fitted portion) are disposed in the vicinity of the peripheral edge of the mounting hole 101a in the housing 101.

The illustrated example assumes a case where the mounting hole 101a and the fitted portion 101c are directly disposed in the housing 101. However, at least any one of the mounting hole 101a and the fitted portion 101c may be disposed in a mounting member with the mounting member being disposed in the housing 101.

The number and arrangement positions of the fitted portions 101c are the same as the number and arrangement positions of projecting fitted portions 14b (corresponding to an example of a second fitted portion) corresponding thereto. When the lighting device 1 is mounted on the lamp 100, the fitted portion 101c is fitted into the projecting fitted portion 14b corresponding thereto. Accordingly, a mounting position in the direction of rotation of the lighting device 1 can be defined.

Preferably, the housing 101 that has the fitted portions 101c is formed of a material which is softer than the material of the projecting portion 14 and has insulation properties. In this manner, the generation of conductive waste resulting from scraping or the like can be inhibited even when the projecting portion 14 is formed of the high thermal conductivity resin that has conductivity.

The fitted portion 101c can be formed by the use of a resin such as acrylonitrile butadiene styrene (ABS) and polycarbonate (PC).

The shapes of the fitted portions 14b and the fitted portions 101c are not particularly limited. The fitted portions 14b and the fitted portions 101c may have any shape insofar as the fitted portions 14b and the fitted portions 101c can be fitted into each other. For example, the fitted portion 14b may have a concave shape with an opening in an end face on an outer peripheral side of the projecting portion 14 to correspond thereto or without an opening in the end face on the outer peripheral side of the projecting portion 14. The fitted portion 14b may be a groove, may be a hole penetrating the projecting portion 14, or may be a bottomed hole not penetrating the projecting portion 14.

The fitted portion 14b can also have a tapered shape with a sectional dimension decreasing as the distance between a flange portion 12 of the lighting device 1 and the fitted portion 14b increases.

When the fitted portion 101c is given a tapered shape to correspond to the tapered fitted portion 14b, the fitted portion 14b can be led into the fitted portion 101c, and thus positioning is facilitated. In addition, rattling in the direction of rotation can also be inhibited.

As illustrated in FIGS. 1A and 1B, the cover 102 is disposed to block the opening of the housing 101. The cover 102 can be formed of, for example, a light-transmitting resin.

The cover 102 can have the function of a lens or the like.

The reflection unit 103 allows a predetermined light distribution pattern to be formed by reflecting the light that is emitted from the lighting device 1. The reflection unit 103 is disposed coaxially with the central axis of the mounting hole 101a in the housing 101.

The seal member 104 is disposed on the surface of the flange portion 12 on the projecting portion 14 side. The seal member 104 can be formed of an elastic material such as rubber and a silicone resin.

When the lighting device 1 is mounted on the lamp 100, the seal member 104 is pinched between the flange portion 12 and the housing 101. Accordingly, the internal space of the lamp 100 is sealed by the seal member 104.

In addition, the fitted portion 14b is pressed against the fitted portion 101c by the elastic force of the seal member 104. Accordingly, detachment of the lighting device 1 from the housing 101 can be inhibited.

The lamp 100 is subjected to vibration caused by traveling or is used in an environment of significant temperature change (−40° C. to 85° C.). In other words, the lamp 100 is used in an environment in which the fastening part described above is likely to loosen.

During the replacement of the lighting device 1 for maintenance or the like, it is preferable that the lighting device 1 can be easily removed from the housing 101.

Accordingly, the fixing units 105 to 107 are disposed in the lamp 100 according to this embodiment.

The fixing units 105 to 107 press the flange portion 12 against the housing 101 in the vicinity of the peripheral edge of the mounting hole 101a where the storage portion 11 is disposed.

Figure 2:
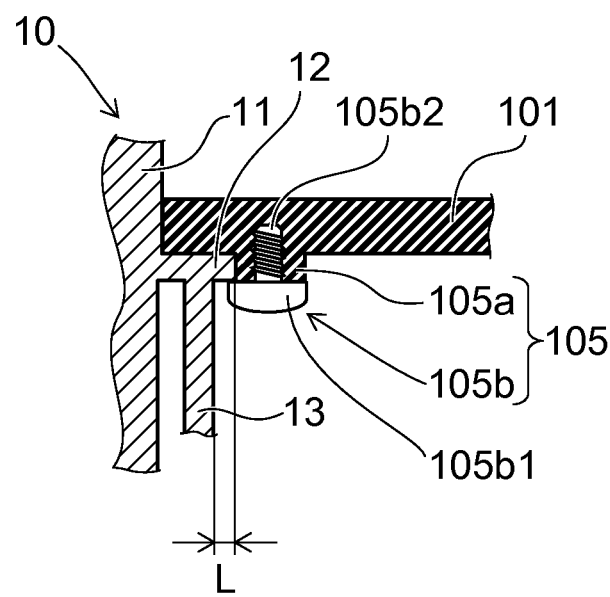
FIG. 2 is a schematic sectional view illustrating an example of a fixing unit 105.

FIG. 2 is a schematic sectional view illustrating an example of the fixing unit 105.

FIG. 2 is a schematic enlarged view of the A section in FIG. 1B.

As illustrated in FIG. 2, a seat portion 105a and a fastening member 105b are disposed in the fixing unit 105.

The seat portion 105a is disposed in the vicinity of the peripheral edge of the mounting hole 101a outside the housing 101. In this case, the seat portion 105a is disposed on the housing 101 to be positioned in the vicinity of a peripheral edge of the flange portion 12.

The seat portion 105a is disposed to protrude outward from the housing 101.

The thickness dimension of the seat portion 105a is slightly less than the thickness dimension of the flange portion 12. Accordingly, the flange portion 12 can be pressed against the housing 101 by a head portion 105b1 of the fastening member 105b.

The seat portion 105a can be disposed integrally with the housing 101 or can be disposed separately from the housing 101. In a case where the seat portion 105a and the housing 101 are disposed separately from each other, the seat portion 105a may be bonded to the housing 101 or the seat portion 105a may not be bonded to the housing 101.

A female screw can be disposed in the seat portion 105a. Also, a hole can be disposed in the seat portion 105a and a female screw can be disposed in the housing 101. In addition, female screws can be disposed in the seat portion 105a and the housing 101.

In other words, the female screw may be disposed in at least any one of the housing 101 and the seat portion 105a.

The shape of the seat portion 105a is not particularly limited. For example, the seat portion 105a may have a columnar shape or an annular shape to surround the mounting hole 101a.

In a case where the seat portion 105a has a columnar shape, the number and arrangement positions of the seat portions 105a are not particularly limited. In a case where the seat portion 105a has a columnar shape, the number of the seat portions 105a that are disposed may be one or more.

The fastening member 105b is not particularly limited insofar as the fastening member 105b is capable of restraining the flange portion 12. It is preferable that the fastening member 105b is easily removed and mounted in view of the replacement of the lighting device 1 during maintenance or the like.

For example, the fastening member 105b can have the head portion 105b1 and a male screw portion 105b2. The head portion 105b1 is in contact with the flange portion 12. The male screw portion 105b2 is connected to the head portion 105b1 and has a male screw that corresponds to a female screw which is disposed in at least any one of the housing 101 and the seat portion 105a.

A plate-shaped member (not illustrated) can also be disposed to be pinched between the head portion 105b1 and the flange portion 12.

As described later, the flange portion 12 is formed of a high thermal conductivity resin in some cases. The high thermal conductivity resin is brittle, and thus is likely to cause breaking or the like.

When the plate-shaped member (not illustrated) is disposed to be pinched between the head portion 105b1 and the flange portion 12, the plate-shaped member can cause an increase in contact area. Accordingly, the breaking, splintering, or cracking of the flange portion 12 formed of the high thermal conductivity resin can be inhibited.

Preferably, the dimension L of a flat portion in the vicinity of the peripheral edge of the flange portion 12 (such as the dimension between the peripheral edge of the flange portion 12 and a fin 13) is at least 1 mm.

When the dimension L of the flat portion is at least 1 mm, the breaking, splintering, or cracking of the flange portion 12 formed of the high thermal conductivity resin can be inhibited.

Figure 3:
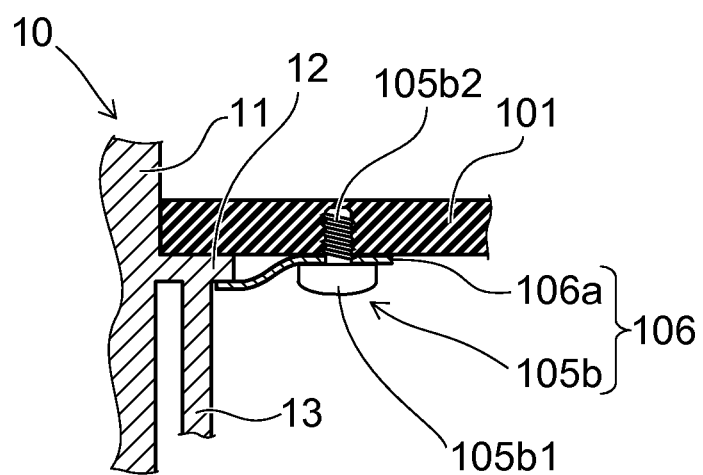
FIG. 3 is a schematic sectional view illustrating an example of a fixing unit 106 according to another embodiment.

FIG. 3 is a schematic sectional view illustrating an example of a fixing unit 106 according to another embodiment.

As illustrated in FIG. 3, a pressing member 106a and the fastening member 105b are disposed in the fixing unit 106.

The pressing member 106a has a plate shape and is formed of an elastic material. The pressing member 106a can be formed of a metal such as stainless steel and spring steel.

One end portion side of the pressing member 106a is in contact with the flange portion 12 and the other end portion side of the pressing member 106a is fixed to the housing 101 by the fastening member 105b.

In other words, the pressing member 106a is disposed in the housing 101 so that the other end portion side is positioned in the vicinity of the peripheral edge of the flange portion 12.

The shape of the pressing member 106a is not particularly limited insofar as the flange portion 12 can be pressed against the housing 101 by an elastic force. For example, the pressing member 106a can be a flat plate-shaped body or can be a plate-shaped body bent into a crank shape. In addition, the pressing member 106a can have a strip-like planar shape or can have an annular planar shape.

Figure 4A:
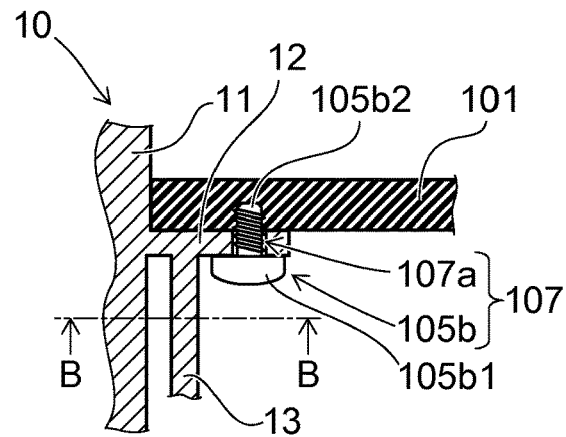
FIG. 4A is a schematic sectional view of a fixing unit 107.
Figure 4B:
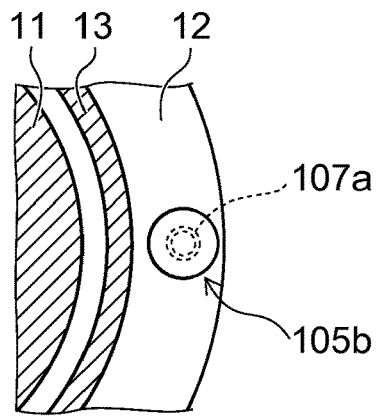
FIG. 4B is an arrow view taken along line IVB-IVB in FIG. 4A.
Figure 4C:
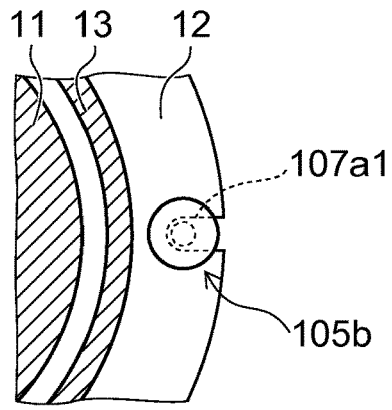
FIG. 4C is a schematic diagram illustrating an example of a hole portion 107a1 according to another embodiment.

FIGS. 4A, 4B, and 4C are schematic sectional views illustrating an example of a fixing unit 107 according to another embodiment.

FIG. 4A is a schematic sectional view of the fixing unit 107.

FIG. 4B is an arrow view taken along line IVB-IVB in FIG. 4A.

FIG. 4C is a schematic diagram illustrating an example of a hole portion 107a1 according to another embodiment.

As illustrated in FIGS. 4A and 4B, a hole portion 107a and the fastening member 105b are disposed in the fixing unit 107.

The hole portion 107a is disposed in the flange portion 12. The hole portion 107a penetrates the flange portion 12 in the thickness direction.

The fastening member 105b has the head portion 105b1 and the male screw portion 105b2.

The head portion 105b1 is in contact with the flange portion 12.

The male screw portion 105b2 has one end portion side connected to the head portion 105b1. The other end portion side of the male screw portion 105b2 is disposed in the female screw that is disposed in the housing 101 via the hole portion 107a which is disposed in the flange portion 12.

In other words, the male screw portion 105b2 is screwed into the female screw that is disposed in the housing 101 through the inner portion of the hole portion 107a.

Accordingly, the fastening member 105b can press the flange portion 12 against the housing 101.

The hole portion 107a can be a hole that has a circular sectional shape.

As illustrated in FIG. 4C, the hole portion 107a1 can be open toward the peripheral edge of the flange portion 12.

The numbers and arrangement positions of the hole portions 107a and 107a1 are not particularly limited. The numbers of the hole portions 107a and 107a1 that are disposed may be at least one each.

With the fixing unit 107 that has this configuration, a simplified and cost-reduced configuration can be achieved.

With the lamp 100 according to this embodiment, the mounting and removal of the lighting device 1 can be facilitated during, for example, maintenance.

In addition, detachment of the lighting device 1 can be inhibited during the use of the lamp 100.

Hereinafter, an example of the lighting device 1 will be described.

Figure 5:
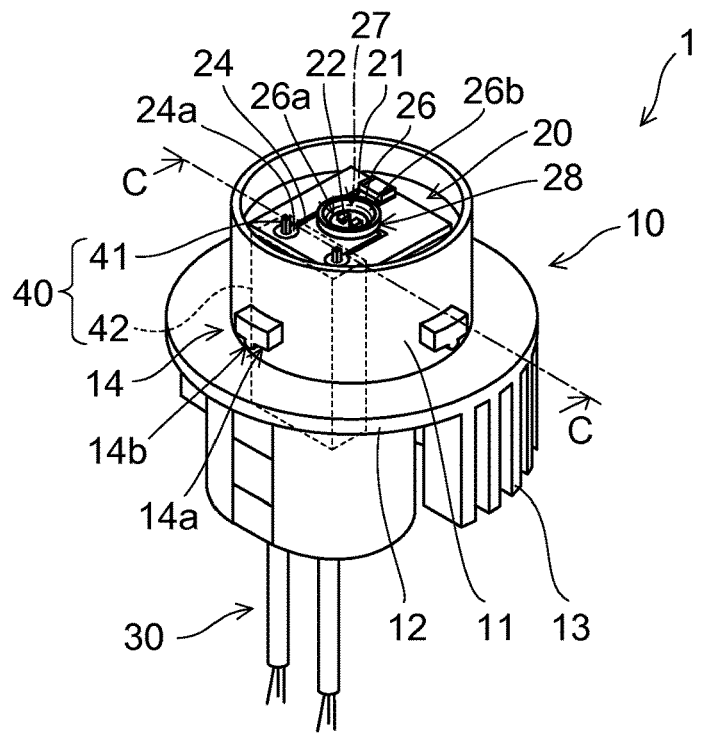
FIG. 5 is a schematic perspective view illustrating an example of a lighting device 1 according to this embodiment.

FIG. 5 is a schematic perspective view illustrating an example of the lighting device 1 according to this embodiment.

Figure 6:
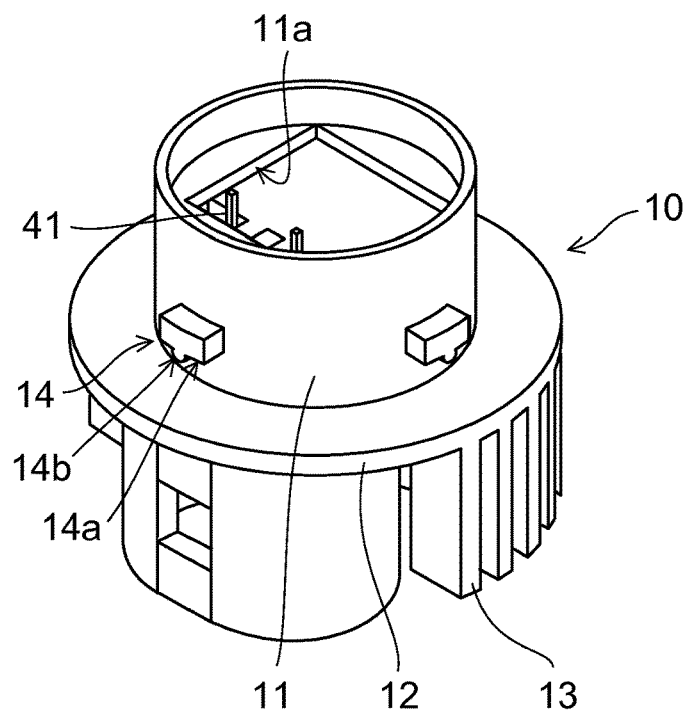
FIG. 6 is a schematic perspective view of a main body portion 10.

FIG. 6 is a schematic perspective view of a main body portion 10.

Figure 7:
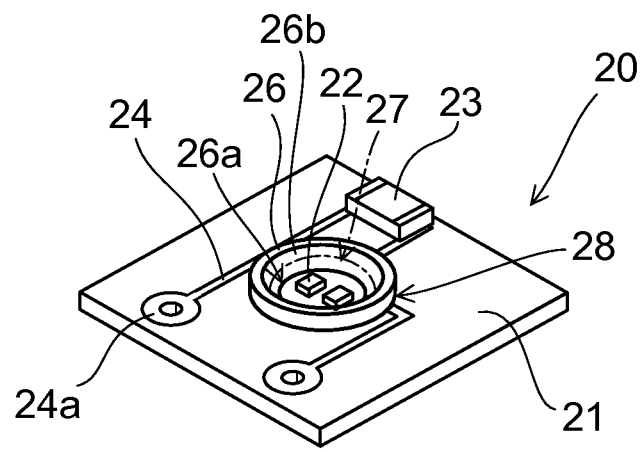
FIG. 7 is a schematic perspective view of a light-emitting module 20.

FIG. 7 is a schematic perspective view of a light-emitting module 20.

Figure 8:
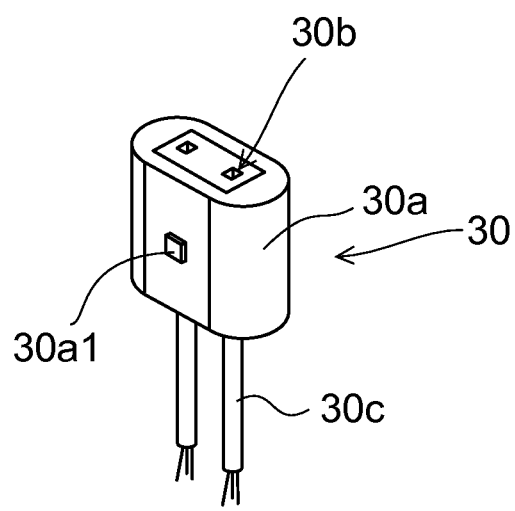
FIG. 8 is a schematic perspective view of a socket 30.

FIG. 8 is a schematic perspective view of a socket 30.

Figure 9:
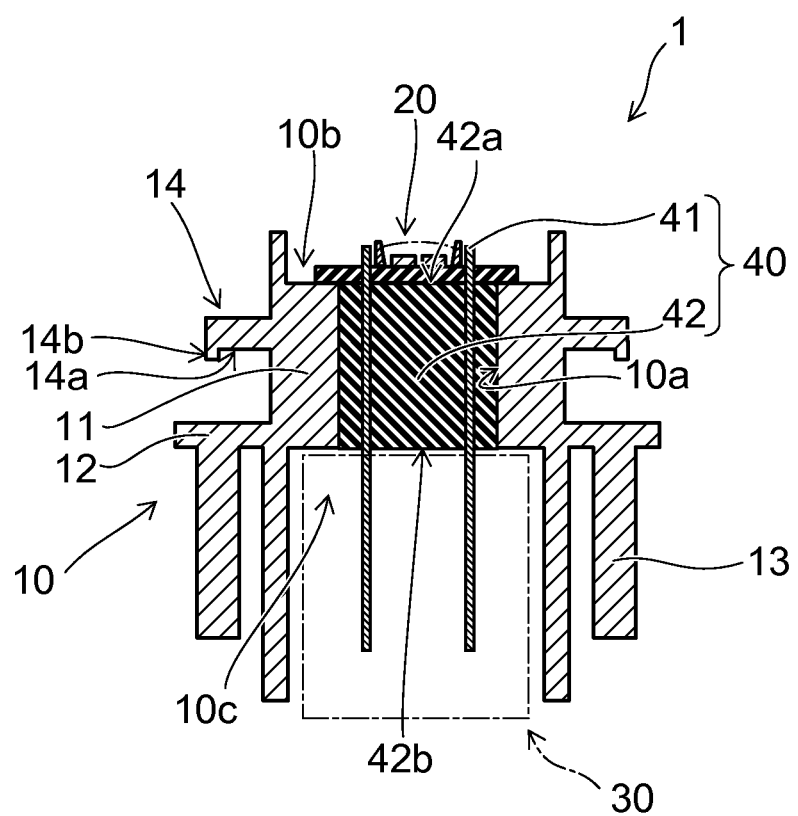
FIG. 9 is a schematic sectional view illustrating an example of an electric power supply unit 40.

FIG. 9 is a schematic sectional view illustrating an example of an electric power supply unit 40.

FIG. 9 is a diagram showing the section taken along line VC-VC in FIG. 5.

As illustrated in FIG. 5, the main body portion 10, the light-emitting module 20, the socket 30, and the electric power supply unit 40 are disposed in the lighting device 1.

As illustrated in FIG. 5 or FIG. 6, the storage portion 11, the flange portion 12, the fin 13, and the projecting portion 14 are disposed in the main body portion 10.

The storage portion 11 has a cylindrical shape and protrudes from one surface of the flange portion 12. A concave portion 11a is disposed in the storage portion 11.

A substrate 21 is disposed on a bottom surface of the concave portion 11a. The surface of the substrate 21 on the side opposite to the side where a light-emitting element 22 is disposed is in contact with the bottom surface of the concave portion 11a.

In other words, the light-emitting module 20 is disposed in the end portion of the storage portion 11 on the side opposite to the flange portion 12 side.

A plurality of electric power supply terminals 41 protrude from the bottom surface of the concave portion 11a. The plurality of electric power supply terminals 41 are not in contact with the bottom surface of the concave portion 11a.

The flange portion 12 has a disk shape. The storage portion 11 is disposed on one surface of the flange portion 12 and the fin 13 is disposed on the other surface of the flange portion 12.

A plurality of the fins 13 are disposed to protrude from the surface of the flange portion 12. The plurality of fins 13 have a plate shape and function as heat radiation fins.

The projecting portion 14 is disposed on the side wall of the storage portion 11. The projecting portion 14 protrudes outward from the side wall of the storage portion 11. The projecting portion 14 has the projecting fitted portion 14b on the surface 14a on the flange portion 12 side.

The number and arrangement positions of the projecting portions 14 are not particularly limited.

In this case, the lighting device 1 can be stably held when a plurality of the projecting portions 14 are disposed.

It is preferable that the number of the projecting portions 14 that are disposed is at least three for the lighting device 1 to be stably held. In the example that is illustrated in FIG. 5 or FIG. 6, the number of the projecting portions 14 that are disposed is four.

Herein, the main body portion 10 has two functions, one being the storage of the light-emitting module 20 and the other being the release of the heat generated in the light-emitting module 20 to the outside of the lighting device 1.

Accordingly, it is preferable that the storage portion 11, the flange portion 12, the fin 13, and the projecting portion 14 are formed of a material which has a high level of thermal conductivity in view of the release of the heat to the outside.

The storage portion 11, the flange portion 12, the fin 13, and the projecting portion 14 can be formed of, for example, a metal such as aluminum or a high thermal conductivity resin.

The high thermal conductivity resin is, for example, a mixture of a resin, such as polyethylene terephthalate (PET) and nylon, and particles and a fiber formed of carbon or the like having a high level of thermal conductivity.

Herein, it is preferable that the lighting device 1 is light in weight.

Accordingly, it is preferable that the storage portion 11, the flange portion 12, the fin 13, and the projecting portion 14 are formed of the high thermal conductivity resin.

The storage portion 11, the flange portion 12, the fin 13, and the projecting portion 14 can be integrally molded.

The storage portion 11, the flange portion 12, the fin 13, and the projecting portion 14 can also be bonded after being separately formed. In a case where the storage portion 11, the flange portion 12, the fin 13, and the projecting portion 14 are separately formed, the storage portion 11, the flange portion 12, the fin 13, and the projecting portion 14 can be formed of the same material or can be formed of different materials.

As illustrated in FIG. 7, the substrate 21, the light-emitting element 22, a control element 23, a surrounding wall member 26, a sealing unit 27, a junction 28, and a wiring pattern 24 are disposed in the light-emitting module 20.

The substrate 21 is disposed in the storage portion 11 of the main body portion 10.

The substrate 21 has a plate shape. The wiring pattern 24 is disposed on a surface of the substrate 21.

The material and structure of the substrate 21 are not particularly limited. For example, the substrate 21 can be formed of an inorganic material (ceramics) such as aluminum oxide and aluminum nitride, an organic material such as paper phenol and glass epoxy, or the like. In addition, the substrate 21 can be formed by covering a surface of a metal plate with an insulating material. In a case where the surface of the metal plate is covered with the insulating material, the insulating material may be one formed of an organic material or may be one formed of an inorganic material.

In a case where the light-emitting element 22 generates a large amount of heat, it is preferable that the substrate 21 is formed by the use of a material having a high level of thermal conductivity in view of heat radiation. Examples of the material having a high level of thermal conductivity can include ceramics such as aluminum oxide and aluminum nitride and what is obtained by covering a surface of a metal plate with an insulating material.

The substrate 21 may have a single layer or may have multiple layers.

A plurality of the light-emitting elements 22 are mounted on the wiring pattern 24 that is disposed on the surface of the substrate 21.

The light-emitting element 22 can have an electrode (not illustrated) on the surface (upper surface) on the side opposite to the side of arrangement on the wiring pattern 24. The electrode (not illustrated) may be disposed on the surface (lower surface) on the side of arrangement on the wiring pattern 24 and on the surface (upper surface) on the side opposite to the side of arrangement on the wiring pattern 24 or may be disposed on any one of the two surfaces.

The electrode (not illustrated) that is disposed on the lower surface of the light-emitting element 22 is electrically connected to a mounting pad which is disposed on the wiring pattern 24 via a conductive and thermosetting material such as silver paste. The electrode (not illustrated) that is disposed on the upper surface of the light-emitting element 22 is electrically connected to a wiring pad which is disposed on the wiring pattern 24 via wiring.

The light-emitting element 22 can be, for example, a light-emitting diode, an organic light-emitting diode, or a laser diode.

The upper surface of the light-emitting element 22, which is a light-emitting surface, is directed toward the front side of the lighting device 1 and emits light mainly toward the front side of the lighting device 1.

The number, size, arrangement, and the like of the light-emitting elements 22 are not limited to the example described herein and can be appropriately changed depending on the size, application, and the like of the lighting device 1.

The control element 23 is mounted on the wiring pattern 24.

The control element 23 controls the current that flows through the light-emitting element 22. In other words, the control element 23 controls light emission by the light-emitting element 22.

The number, size, and the like of the control elements 23 are not limited to the example described herein and can be appropriately changed depending on the number, specifications, and the like of the light-emitting elements 22.

A case where the light-emitting element 22 is mounted on the wiring pattern 24 by the use of a chip on board (COB) method is described as an example herein. However, a plastic leaded chip carrier (PLCC)-type light-emitting unit provided with the light-emitting element 22 may also be mounted on the wiring pattern 24.

The surrounding wall member 26 is disposed on the substrate 21 to surround the plurality of light-emitting elements 22. The surrounding wall member 26 has, for example, an annular shape with the plurality of light-emitting elements 22 being arranged in a central portion 26a.

The surrounding wall member 26 can be formed of a resin such as polybutylene terephthalate (PBT) and polycarbonate (PC), ceramics, or the like.

In a case where the surrounding wall member 26 is formed of a resin, reflectance with respect to the light that is emitted from the light-emitting element 22 can be improved by the mixing of particles such as titanium oxide particles.

The particles are not limited to the titanium oxide particles and the mixing may employ particles formed of a material having a high level of reflectance with respect to the light that is emitted from the light-emitting element 22.

The surrounding wall member 26 can also be formed of a white resin or the like.

A side wall surface 26b of the surrounding wall member 26 on the central portion 26a side is an inclined surface. Some of the light that is emitted from the light-emitting element 22 is reflected by the side wall surface 26b of the surrounding wall member 26 and is emitted toward the front side of the lighting device 1.

The light that is totally reflected by the upper surface of the sealing unit 27 (interface between the sealing unit 27 and outside air), which is some of the light that is emitted from the light-emitting element 22 toward the front side of the lighting device 1, is reflected by the side wall surface 26b of the surrounding wall member 26 on the central portion 26a side and is emitted back toward the front side of the lighting device 1.

In other words, the surrounding wall member 26 can also function as a reflector. The shape of the surrounding wall member 26 is not limited to the example described herein and can be appropriately changed.

The sealing unit 27 is disposed in the central portion 26a of the surrounding wall member 26. The sealing unit 27 is disposed to cover the inner portion of the surrounding wall member 26. In other words, the sealing unit 27 is disposed in the surrounding wall member 26 and covers the light-emitting element 22, the wiring, and the wiring pattern 24 arranged in the central portion 26a of the surrounding wall member 26.

The sealing unit 27 is formed of a light-transmitting material. The sealing unit 27 can be formed of a silicone resin or the like.

For example, the sealing unit 27 can be formed by filling the central portion 26a of the surrounding wall member 26 with a resin. The resin filling can be performed by the use of a liquid dispensing device such as a dispenser.

When the central portion 26a of the surrounding wall member 26 is filled with a resin, mechanical contact of the light-emitting element 22, the wiring pattern 24 arranged in the central portion 26a of the surrounding wall member 26, the wiring, and the like with the outside can be inhibited. In addition, contact of the light-emitting element 22, the wiring pattern 24 arranged in the central portion 26a of the surrounding wall member 26, the wiring, and the like with, for example, gas containing moisture or sulfur can be inhibited. Accordingly, the reliability of the lighting device 1 can be improved. In addition, a reaction between the silver and the sulfur contained in the wiring pattern 24 can be inhibited.

The sealing unit 27 can contain a phosphor. Examples of the phosphor include a YAG-based phosphor (yttrium aluminum garnet-based phosphor).

In a case where the light-emitting element 22 is a blue light-emitting diode and the phosphor is a YAG-based phosphor, for example, the YAG-based phosphor is excited by the blue light that is emitted from the light-emitting element 22 and a yellow fluorescence is emitted from the YAG-based phosphor. Then, the blue light and the yellow light are mixed with each other and white light is emitted from the lighting device 1. The type of the phosphor and the type of the light-emitting element 22 are not limited to the example described herein and can be appropriately changed for a desired luminescent color depending on the application or the like of the lighting device 1.

The junction 28 bonds the surrounding wall member 26 and the substrate 21 to each other.

The junction 28 has a film shape and is disposed between the surrounding wall member 26 and the substrate 21. The junction 28 can be formed by, for example, curing a silicone-based adhesive or an epoxy-based adhesive.

The wiring pattern 24 is disposed on at least one of the surfaces of the substrate 21.

The wiring pattern 24 can be disposed on both surfaces of the substrate 21. However, it is preferable that the wiring pattern 24 is disposed on one of the surfaces of the substrate 21 for a reduction in manufacturing cost.

An input terminal 24a is disposed in the wiring pattern 24.

A plurality of the input terminals 24a are disposed. The electric power supply terminals 41 are electrically connected to the input terminals 24a. Accordingly, the light-emitting element 22 is electrically connected to the electric power supply terminals 41 via the wiring pattern 24.

If necessary, a circuit component (not illustrated) can be appropriately disposed. The circuit component (not illustrated) can be mounted on, for example, the wiring pattern 24.

As illustrated in FIG. 8, a main body portion 30a, a female terminal 30b, and wiring 30c are disposed in the socket 30.

The main body portion 30a is formed of an insulating material such as a resin. A projecting portion 30a1 is disposed on the side wall of the main body portion 30a. The socket 30 is held in the main body portion 10 when the projecting portion 30a1 is fitted into the concave portion disposed in the main body portion 10.

The female terminal 30b extends in the main body portion 30a.

One end portion of the female terminal 30b is exposed to one end face of the main body portion 30a. The electric power supply terminal 41 is fitted into the end portion of the female terminal 30b that is exposed to the one end face of the main body portion 30a.

The wiring 30c is electrically connected to the other end portion of the female terminal 30b.

An electric power supply (not illustrated) or the like is electrically connected to the wiring 30c.

Accordingly, the electric power supply (not illustrated) and the light-emitting element 22 are electrically connected to each other when the socket 30 is fitted into the electric power supply terminal 41.

The socket 30 can be bonded to an element on the main body portion 10 side by the use of an adhesive or the like.

As illustrated in FIG. 9, the electric power supply terminal 41 and a holding unit 42 are disposed in the electric power supply unit 40.

A plurality of the electric power supply terminals 41 are disposed.

The electric power supply terminal 41 has a linear shape and is formed of a conductivity material such as a metal.

The plurality of electric power supply terminals 41 extend through the holding unit 42.

The end portion of the electric power supply terminal 41 on the input terminal 24a side protrudes from the end portion 42a of the holding unit 42 on the input terminal 24a side. The electric power supply terminal 41 that protrudes from the end portion 42a of the holding unit 42 protrudes from the bottom surface of the concave portion 11a and is electrically connected to the input terminal 24a.

The end portion of the electric power supply terminal 41 on the socket 30 side protrudes from the end portion 42b of the holding unit 42 on the socket 30 side. The electric power supply terminal 41 that protrudes from the end portion 42b of the holding unit 42 is fitted into the female terminal 30b.

The number of the electric power supply terminals 41 illustrated herein is two. However, the number, shape, and the like of the electric power supply terminals 41 are not limited to the example described herein and can be appropriately changed.

As described above, it is preferable that the main body portion 10 is formed of a high thermal conductivity resin, a metal, or the like.

In this case, the high thermal conductivity resin may be a mixture of a resin and a conductive substance such as carbon. Accordingly, the high thermal conductivity resin may have conductivity.

In a case where the main body portion 10 is formed of a conductive high thermal conductivity resin or a metal, a short circuit occurs when the main body portion 10 and the electric power supply terminal 41 are brought into contact with each other.

Accordingly, the holding unit 42, which is formed of a material that has insulating properties, is disposed between the main body portion 10 and the electric power supply terminal 41.

The holding unit 42 is disposed in a hole 10a that is disposed in the main body portion 10.

The hole 10a penetrates the space between the end portion 10b of the main body portion 10 on the side where the light-emitting module 20 is disposed and the end portion 10c of the main body portion 10 on the side where the socket 30 is disposed.

The lamp 100 is used in an environment that has a temperature of −40° C. to 85° C. Accordingly, it is preferable that the difference between the linear expansion coefficient of the high thermal conductivity resin that is the material of the main body portion 10 and the linear expansion coefficient of the resin that is the material of the holding unit 42 is minimized. Then, the thermal stress that arises between the main body portion 10 and the holding unit 42 can be reduced even when the lighting device 1 is used in an environment of significant temperature change.

In this case, the holding unit 42 can be formed by the use of a resin contained in a high thermal conductivity resin.

In a case where the high thermal conductivity resin is a mixture of PET and particles and a fiber formed of carbon, for example, the holding unit 42 can be formed by the use of the PET.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A vehicle lamp comprising:
a lighting device;
a housing where the lighting device is disposed; and
a fixing unit pressing the lighting device against the housing,
wherein the lighting device includes:
a flange portion;
a storage portion protruding from one surface of the flange portion; and
a light-emitting module disposed in an end portion of the storage portion on a side opposite to a side of the flange portion,
the light-emitting module comprising a light-emitting element,
wherein the housing includes a hole where the storage portion is disposed,
wherein the housing further includes a concave first fitted portion disposed in the vicinity of a peripheral edge of the hole in the housing,
wherein the lighting device further includes a projecting portion protruding outward from a side wall of the storage portion and having a projecting second fitted portion on the surface on the side of the flange portion, and
wherein the fixing unit presses the flange portion against the housing in the vicinity of the peripheral edge of the hole where the storage portion is disposed.

2. The vehicle lamp according to claim 1, wherein the flange portion contains a high thermal conductivity resin.

3. The vehicle lamp according to claim 1, wherein the concave first fitted portion is fitted into the projected second fitted portion.

4. The vehicle lamp according to claim 1, further comprising an elastic seal member disposed between the flange portion and the housing.

5. The vehicle lamp according to claim 1, wherein the housing has insulation properties and is formed of a material softer than the material of the projecting portion.

6. The vehicle lamp according to claim 1, wherein the housing is formed of ABS or PC.

7. The vehicle lamp according to claim 1, wherein a sectional dimension of the projected second fitted portion decreases as a distance between the projected second fitted portion and the flange portion increases.

8. The vehicle lamp according to claim 7, wherein the projected second fitted portion has a tapered shape.

9. The vehicle lamp according to claim 1, wherein the fixing unit includes:
   a seat portion disposed on the housing to be positioned in the vicinity of a peripheral edge of the flange portion outside the housing; and
   a fastening member comprising:
      a head portion in contact with the flange portion; and
      a male screw portion connected to the head portion and having a male screw corresponding to a female screw disposed in at least any one of the housing and the seat portion.

10. The vehicle lamp according to claim 9, wherein the fixing unit further includes a plate-shaped member disposed between the head portion and the flange portion.

11. The vehicle lamp according to claim 9, wherein a thickness dimension of the seat portion is slightly less than a thickness dimension of the flange portion.

12. The vehicle lamp according to claim 1, wherein the fixing unit includes a fastening member comprising:
   a head portion in contact with the flange portion; and
   a male screw portion having one end portion side connected to the head portion and the other end portion side disposed in a female screw disposed in the housing via a hole disposed in the flange portion.

13. The vehicle lamp according to claim 12, wherein the hole has a circular sectional shape.

14. The vehicle lamp according to claim 12, wherein the hole is open toward a peripheral edge of the flange portion.

15. The vehicle lamp according to claim 1, wherein the fixing unit is disposed in the housing so that one end portion side is in contact with the flange portion and the other end portion side is positioned in the vicinity of a peripheral edge of the flange portion and is provided with an elastic pressing member.

16. The vehicle lamp according to claim 15, wherein an end portion of the elastic pressing member is fixed to the housing by a fastening member.

17. The vehicle lamp according to claim 15, wherein the elastic pressing member is a flat plate-shaped body or a plate-shaped body bent into a crank shape.

18. The vehicle lamp according to claim 15, wherein the elastic pressing member has a strip-like planar shape or an annular planar shape.

19. The vehicle lamp according to claim 15, wherein the elastic pressing member is formed of stainless steel or spring steel.

\* \* \* \* \*